US011835161B2

(12) United States Patent
Mann

(10) Patent No.: US 11,835,161 B2
(45) Date of Patent: Dec. 5, 2023

(54) DEVICE FOR CONNECTING FLUID LINES AND OTHER LINES

(71) Applicant: NORMA Germany GmbH, Maintal (DE)

(72) Inventor: Stephan Mann, Maintal (DE)

(73) Assignee: Norma Germany GmbH, Maintal (DE)

( * ) Notice: Subject to any disclaimer, the term of this patent is extended or adjusted under 35 U.S.C. 154(b) by 68 days.

(21) Appl. No.: 17/607,932

(22) PCT Filed: Apr. 20, 2020

(86) PCT No.: PCT/EP2020/061022
§ 371 (c)(1),
(2) Date: Nov. 1, 2021

(87) PCT Pub. No.: WO2020/221616
PCT Pub. Date: Nov. 5, 2020

(65) Prior Publication Data
US 2022/0290789 A1 Sep. 15, 2022

(30) Foreign Application Priority Data
Apr. 30, 2019 (DE) ...................... 10 2019 111 131.5

(51) Int. Cl.
F16L 25/01 (2006.01)
F16L 53/38 (2018.01)
(Continued)

(52) U.S. Cl.
CPC ............... *F16L 25/01* (2013.01); *F16L 53/38* (2018.01); *H01R 13/005* (2013.01); *F16L 37/244* (2013.01)

(58) Field of Classification Search
CPC ........... F16L 37/44; F16L 25/01; F16L 53/38; H01R 13/005
See application file for complete search history.

(56) References Cited

U.S. PATENT DOCUMENTS 5,658,159 A   8/1997   Gardner et al.
5,857,713 A   1/1999   Horimoto
(Continued)

FOREIGN PATENT DOCUMENTS

DE   10253796 A1   6/2004
DE   102010053736 A1   6/2012
(Continued)

OTHER PUBLICATIONS

Korean Office Action for Korean Application No. 10-2021-7037848 dated Feb. 9, 2023 (7 pages).
(Continued)

Primary Examiner — Zachary T Dragicevich
(74) Attorney, Agent, or Firm — REISING ETHINGTON, P.C.

(57) ABSTRACT

A device for connecting fluid lines and other lines. The device has a first connection component for connecting fluid lines and a second connection component for connecting other lines. The first connection component has a first
(Continued)

functional position, in which the first connection component disconnects the two fluid lines from one another, and a second functional position, in which the first connection component connects two fluid lines. The second connection component, in a connection position, connects two other lines and, in a release position, disconnects the two other lines from one another.

19 Claims, 2 Drawing Sheets

(51) Int. Cl.
*H01R 13/00* (2006.01)
*F16L 37/244* (2006.01)

(56) References Cited

U.S. PATENT DOCUMENTS

| | | | | |
|---|---|---|---|---|
| 5,957,713 | A * | 9/1999 | Engle | F16L 25/01 |
| 6,532,931 | B1 * | 3/2003 | Saba | F16L 25/01 |
| 9,360,147 | B2 | 6/2016 | Schwarzkopf et al. | |
| 2013/0341320 | A1 | 12/2013 | Tailor et al. | |
| 2016/0273279 | A1 * | 9/2016 | Richards | E21B 17/003 |
| 2017/0023163 | A1 * | 1/2017 | Ward | F16L 53/38 |
| 2018/0248274 | A1 * | 8/2018 | Lindkamp | H01R 13/005 |

FOREIGN PATENT DOCUMENTS

| | | |
|---|---|---|
| JP | S57100691 U | 6/1982 |
| JP | H09119577 A | 5/1997 |
| JP | 2014503766 A | 2/2014 |

OTHER PUBLICATIONS

English Translation of Korean Office Action for Korean Application No. 10-2021-7037848 dated Feb. 9, 2023 (7 pages).
Chinese Office Action for Chinese Application No. 202080029773.6 dated Sep. 15, 2022 (9 pages).
European Office Action for European Application No. 20721483.4 dated Oct. 28, 2022 (6 pages).
German Office Action for German Application No. 10 2019 111 131.5 dated Mar. 23, 2020 (4 pages).
International Search Report for International Application No. PCT/EP2020/061022 dated Jul. 29, 2020 (3 pages).
English Translation of International Search Report or International Application No. PCT/EP2020/061022 dated Jul. 29, 2020 (2 pages).
Japanese Office Action for Japanese Application No. 2021-560254 dated Nov. 1, 2022 (9 pages).
English Translation of Japanese Office Action for Japanese Application No. 2021-560254 dated Nov. 1, 2022 (12 pages).
Korean Office Action for Korean Application No. 10-2021-7037848 dated Aug. 11, 2023 (4 pages).
English Translation of Korean Office Action for Korean Application No. 10-2021-7037848 dated Aug. 11, 2023 (3 pages).

* cited by examiner

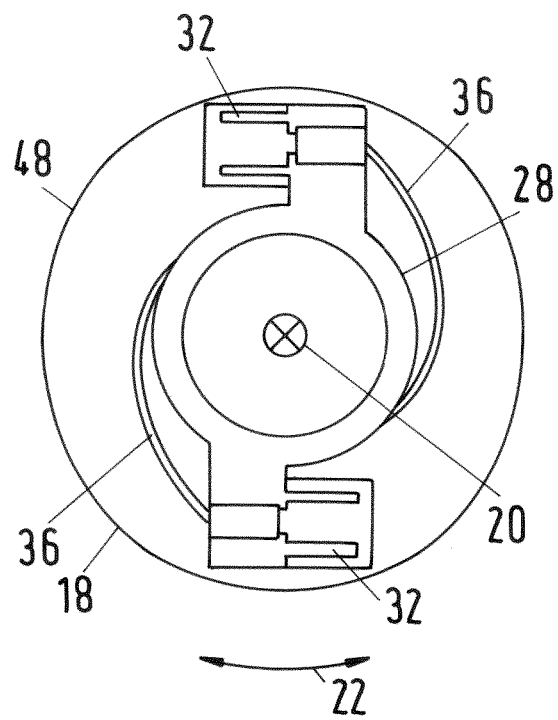 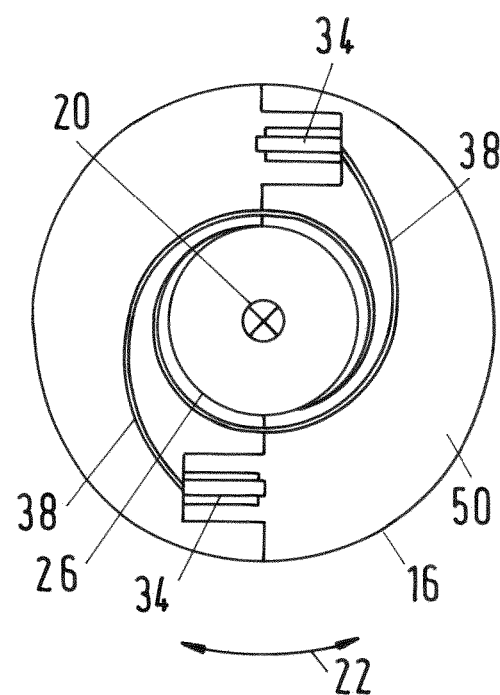
Fig.3a   Fig.3b
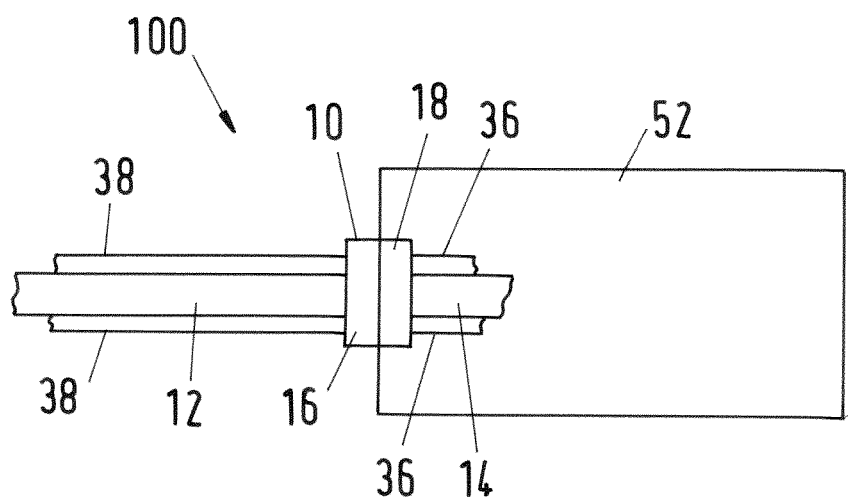
Fig.4

DEVICE FOR CONNECTING FLUID LINES AND OTHER LINES

INTRODUCTION

The disclosure relates to a device for connecting fluid lines and further lines and a system comprising two fluid lines, two further lines and the device.

In order to produce a reliable connection between two fluid lines, for example, plug connections are used. Plug connections are likewise used in the case of electric lines in order to connect two electric lines to one another. In the case of systems which have fluid lines and electric lines, multi-connectors, as described e.g. in DE 10 2010 053 736 A1, are used in order to simultaneously connect the fluid lines and electric lines. These multi-connectors comprise two halves which are arranged in each case on different lines. The multi-connectors furthermore have a male connection piece for fluid lines and a female connection piece for fluid lines which are arranged in each case on one of the halves. The multi-connectors furthermore have a male connection piece for electric lines and a female connection piece for electric lines which are likewise arranged in each case on different halves. In this case, the male connection pieces are introduced along a connection axis of the multi-connector into the respective female connection pieces in order to provide a connection between the fluid lines and the electric lines. In order to produce the connection pieces, it is necessary to allow only small tolerances during manufacture in order to ensure a reliable connection in all tolerance conditions. There is furthermore an absence of an indication which informs one of a correct connection between the lines. This multi-connector thus requires a high degree of outlay in terms of production and operation.

SUMMARY

An object of the disclosure, according to at least one embodiment, can therefore be regarded as providing an improved device and an improved system which require less outlay in terms of production and operation.

There is provided a device for connecting fluid lines and further lines, wherein the device has a first connection component for connecting fluid lines and a second connection component for connecting further lines, wherein the first connection component has a first functional position, in which the first connection component detaches two fluid lines from one another, and a second functional position, in which the first connection component connects the two fluid lines, wherein a movement of the first connection component along a connection axis transfers the first connection component between the first and second functional position, wherein it is provided according to an embodiment that the second connection component, in one connection position, connects two further lines and, in a release position, detaches the two further lines from one another, wherein a movement of the second connection component in a circumferential direction around the connection axis transfers the second connection component between the release position and the connection position if the first connection component is in the second functional position.

A device for connecting fluid lines and further lines is provided, in the case of which the connection of the fluid lines and further lines is performed in two steps. Initially, a connection between the fluid lines is produced by means of the first connection component in that the first connection component is moved from a first functional position, in which the first connection component detaches the two fluid lines from one another, along a connection axis into a second functional position, in which the first connection component connects the two fluid lines to one another. If the two fluid lines are connected to one another, i.e. if the first connection component is in the second functional position, a movement of the device in the circumferential direction around the connection axis is performed. Here, the second connection component is transferred from a release position, in which the second connection component detaches the further lines from one another, into a connection position, in which the second connection component connects the further lines to one another. The connection of the device in the circumferential direction can be a rotation of the device around the connection axis. In this case, the transfer of the second connection component into the connection position is only possible if the first connection component is in the second functional position, i.e. if the two fluid lines are connected to one another. If the further lines are e.g. electric lines, it can thus be ascertained with the connection of the two electric lines, for example, by closing an electric current circuit whether the connection between the fluid lines was performed correctly. If the further lines are optical lines, the information about a correct connection of the two fluid lines can be provided by receiving an optical signal. A device is thus provided per an embodiment, with which device an indication of the correct connection of the fluid lines and the further lines is provided. A device is thus provided which requires less outlay in comparison with the prior art during production and operation.

The device can have, in one example, a locking component which, in a locking position, locks the first connection component in the second functional position and, in an unlocking position, releases the first connection component.

A locking is thus provided which locks a connection between two fluid lines produced by means of the first connection component. This increases the reliability of the connection between the two fluid lines.

The locking component can have a latch element which is oriented along the circumferential direction, wherein a movement of the locking component in the circumferential direction transfers the locking component between the locking position and the unlocking position if the first connection component is in the second functional position.

Locking by means of the locking component is firstly carried out when the first connection component is in the second functional position. The latch element of the locking component is oriented along the circumferential direction. That is, the latch element is moved in the case of a movement of the locking component in the circumferential direction along a longitudinal axis of the latch element. The latch element can be introduced into a socket, wherein the latch element and the socket are arranged on two different fluid lines. An effective locking between the two fluid lines can thus be provided.

The second connection component can furthermore be the locking component.

The locking component and the second connection component are thus formed in one piece. In the case of a locking of the second functional position of the first connection component, a locking is thus performed by means of the second connection component, in the case of which the second connection component is simultaneously transferred into the connection position. The connection position is in this case simultaneously the locking position of the locking component. A space-saving multi-functional component is thus provided for the device. The operation of the device is moreover further simplified as a result of this.

In a further example, the first connection component can have a first male connection element on one of the two fluid lines and a first female connection element on the other of the two fluid lines.

The connection of the two fluid lines can thus be performed in that the first male connection element, which is arranged on one fluid line, is introduced into the first female connection element, which is arranged on the further fluid line.

The first male connection element and the first female connection element can be oriented along the connection axis.

As a result of the orientation of the first male connection element and of the first female connection element along the connection axis, only a movement of the device in the direction of the connection axis is required in order to introduce the first male connection element into the first female connection element. With the movement of the device in the direction of the connection axis, it is required in this case that so are arranged and oriented along the connection axis that the first male connection element and the first female connection element are flush with one another. The first male connection element can thus be introduced into the first female connection element. A relative movement between the first male connection element and the first female connection element is sufficient, i.e. that only one of the two connection elements, i.e. either the first male connection element or the first female connection element, has to be moved in the circumferential direction.

The second connection component can furthermore have a second male connection on one of the two further lines and a second female connection element on the other of the two further lines.

A connection between the further lines can thus be performed in that the second male connection element, which is linked to one of the two further lines, is introduced into the second female connection element, which is linked to another of the two further lines.

The second male connection element and the second female connection element can be oriented along the circumferential direction.

The orientation of the second male connection element and of the second female connection element along the circumferential direction has the effect that a movement of the second male connection element and of the second female connection element in the circumferential direction leads to a connection of the two further lines if the first connection component is in the second functional position. The second male connection element and the second female connection element are moved toward one another. A relative movement between the second male connection element and the second female connection element is sufficient, i.e. only one of the two connection elements, i.e. either the second male connection element or the second female connection element, has to be moved in the circumferential direction.

The device can furthermore have a plurality of second male and second female connection elements. In one example, each fluid line can have e.g. in each case a second male and a second female connection element. The second male connection element of a fluid line can be introduced into the respective second female connection element of the further fluid line if the first connection component is in the second functional position. The plurality of second male connection elements is oriented in the same direction along the circumferential direction. The plurality of the second female connection elements is correspondingly oriented in the same direction along the circumferential direction.

In another example, a fluid line can have all the second male connection elements and the further fluid line all the female connection elements.

Alternatively, the second connection component can have two flat connection elements on the various fluid lines, wherein the flat connection elements touch one another in the connection position.

In a further example, the further lines can be heating wires.

The device can be heated by means of the heating wires so that a freezing of the device, in particular a fluid in the first connection components, can be counteracted. The heating wires can be wound around the first connection component in order to provide full-surface heating of the first connection component and the device.

The further lines can alternatively or additionally be control lines which conduct control signals.

The further lines can likewise alternatively or additionally be optical lines, such as e.g. glass fibers.

The device can furthermore have a first housing half and a second housing half, wherein the first housing half is connected to one of the two fluid lines, wherein the second housing half is connected to the other of the two fluid lines, wherein the first housing half and the second housing half form a housing if the first connection component is in the second functional position, wherein the first and second component are arranged inside the first and second housing half.

The housing halves provide protection for the device and the connection components. A user can furthermore use the two housing halves as working surfaces for handling the device.

The housing halves can have a gap-free connection to one another if the first connection component is in the second functional position.

The imperviousness of the connection between the two fluid lines is improved by means of the gap-free connection between the two housing halves if the first connection component is in the second functional position. A loss of heat is further minimized since there is no direct connection between the surroundings and the interior of the device by means of the gap-free connection if the first connection component is in the second functional position.

The first housing half can furthermore have the first male connection element and the second housing half can have the first female connection element.

The first male connection element and the first female connection element are thus arranged on different fluid lines. The first male connection element is thus furthermore encompassed and protected by the first housing half and the first female connection element is encompassed and protected by the second housing half.

It can furthermore be provided that the first housing half has the second male connection element and the second housing half has the second female connection element.

The second male connection element and the second female connection element are thus arranged on different fluid lines. The second male connection element is thus furthermore encompassed and protected by the first housing half and the second female connection element is encompassed and protected by the second housing half.

In a further example, the device can have a further locking component for locking the first connection component in the second functional position.

With the further locking component, in addition to the first locking component, a locking is brought about so that locking of the section functional position of the first connection component is brought about even in the case of damage to the first locking component. This avoids the connection between the two fluid lines becoming detached and fluid escaping in the event of damage to the first locking component.

The further locking component can have a closure element.

The closure element can be formed, for example, as a bracket which is fastened to one of the two fluid lines. A projection can be provided on the other of the two fluid lines. The bracket can be guided via the projection for locking of the first connection component.

The further locking component can be integrated into the first and/or second housing half.

A reduction in the components is thus brought about and the production of the device is simplified.

In an alternative example, the further locking component can be provided separately and subsequently connected to the device.

The first connection components can furthermore have at least one seal element for arrangement between the two fluid lines.

The at least one seal element can be an O-ring.

A system is furthermore provided comprising a device according to the preceding description, wherein the system comprises two further lines and two fluid lines, wherein the device connects the two further lines and the two fluid lines to one another.

Advantages and effects as well as further developments of the system are apparent from the advantages and effects as well as further developments of the device described above. Reference is therefore made to the above description in this respect.

The system can be a catalytic converter for selective catalytic reduction or a water injection system.

BRIEF DESCRIPTION OF THE FIGURES

Further features, details and advantages of the disclosure are apparent from the wording of the claims and from the following description of exemplary embodiments on the basis of the drawings. In the drawings:

FIGS. 3a, b show a schematic representation of the housing halves of the device; and FIG. 4 shows a schematic representation of the system.

DETAILED DESCRIPTION

The device for connecting fluid lines and further lines is referred to below in its entirety by the reference number 10.

Figure 1:
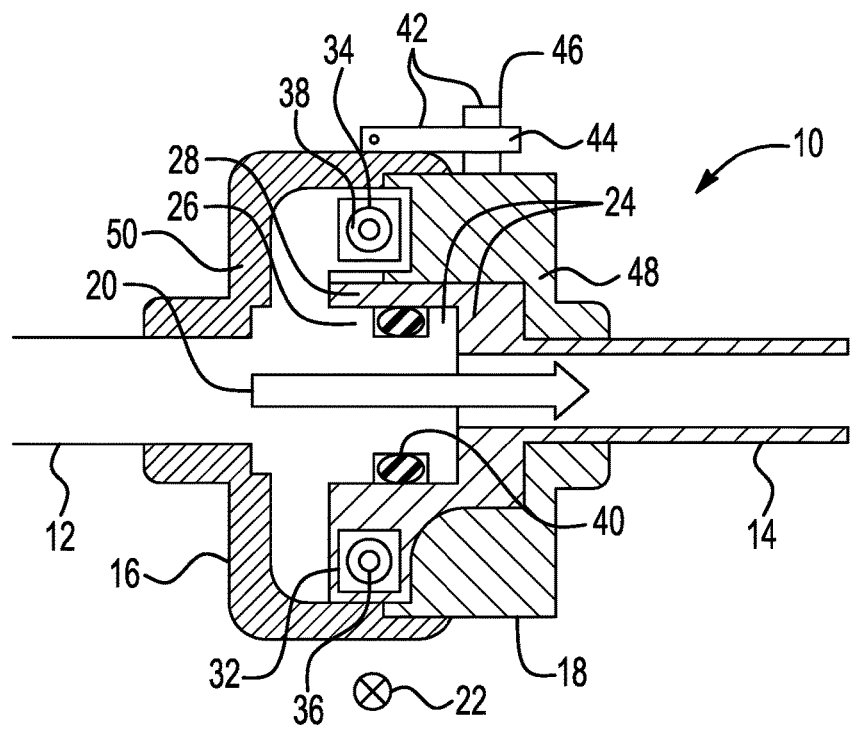
FIG. 1 shows a schematic representation of a device for connecting fluid lines and further lines.

FIG. 1 shows in this case a longitudinal section through two fluid lines 12, 14 and a device 10. Device 10 connects fluid line 12 to fluid line 14. Device 10 comprises a first connection component 24 for connecting fluid lines and a second connection component 30 for connecting further lines.

First connection component 24 has a first functional position in which it detaches fluid line 12 from fluid line 14. First connection component 24 furthermore comprises a second functional position in which it connects fluid line 12 to fluid line 14, as represented in FIG. 1. First connection component 24 further comprises a first male connection element 26 which is connected to fluid line 12 and a first female connection element 28 which is connected to fluid line 14. The transfer from the first functional position into the second functional position is brought about by a movement of first male connection element 26 along a connection axis 20 of device 10 in the direction of first female connection element 28. In this case, first male connection element 26 is introduced into first female connection element 28.

Connection axis 20 is oriented along the longitudinal axis of both fluid lines 12, 14 if both fluid lines 12, 14 are flush with one another.

Figure 2A:
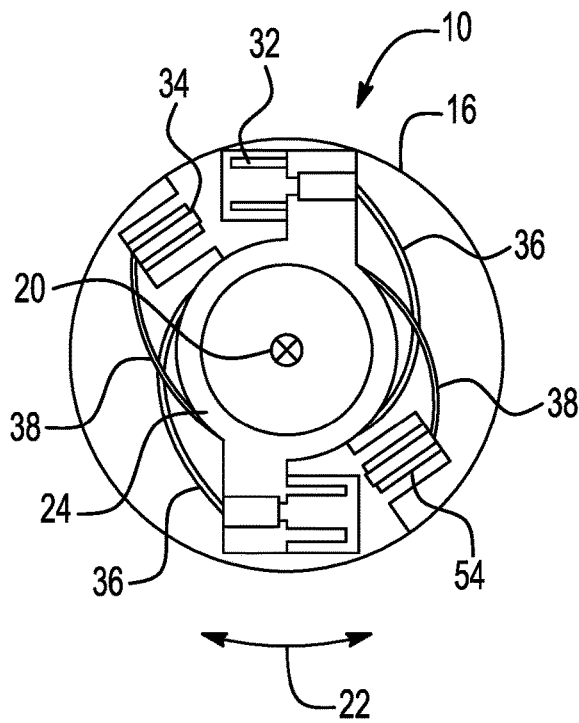
FIGS. 2a, b show a schematic representation of the release position and connection position.
Figure 2B:
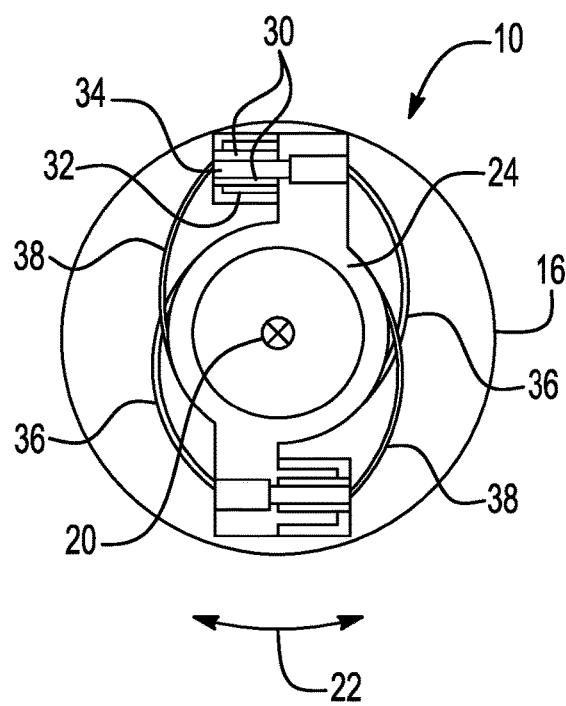

Second connection component 30 is, after introduction of first male connection element 26 into first female connection element 28, initially in the release position in which second connection component 30 detaches further lines 36, 38 from one another, as represented in FIG. 2a. In order to transfer second connection component 30 from the release position into the connection position in which second connection component 30 connects further line 36 to further line 38, fluid lines 12 and 14 are rotated counter to one another around connection axis 20. The connection point is represented in FIG. 2b.

Device 10 according to FIG. 1 further comprises at least one seal element 40 which can be arranged between first male connection element 26 and first female connection element 28 in order to provide a seal if first male connection element 26 is introduced into first female connection element 28 and first connection component 24 is thus in the second functional position. In this case, device 10 can comprise two seal elements 40 which are arranged between first male connection element 26 and first female connection element 28 if first connection component 24 is in the second functional position.

The at least one seal element 40 can be formed as an O-ring which extends around first male connection element 26 if first connection component 24 is in the first functional position. Alternatively, seal element 40 can extend in the first functional position of first connection component 24 along an inner surface, extending around connection axis 20, of first female connection element 28.

The O-ring is furthermore arranged between first male connection element 26 and first female connection element 28 if first connection component 24 is in the second functional position.

In this case, a second male connection element 34 of second connection component 30 is arranged on fluid line 12 and a second female connection element 32 of second connection component 30 is arranged on fluid line 14. By means of the rotation of fluid lines 12 and 14 counter to one another about connection axis 20, second male connection element 34 and second female connection element 32 are moved along a circumferential direction 22 around connection axis 20. The rotation is brought about so that second male connection element 34 is moved toward second female connection element 32. Second male connection element 34 in introduced into second female connection element 32. By introducing second male connection element 34 into second female connection element 32, further lines 36 and 38 are connected to one another. A locking of the second functional position of first connection component 24 is thus furthermore performed. Second connection component 30 thus simultaneously acts as a locking component 54, wherein the release position corresponds to an unlocking position of locking component 54 and the connection position of second connection component 30 corresponds to a locking position of locking component 54. Second male connection element 34 acts as a latch element of locking component 54.

Device 10 can have a further locking component 42. Further locking component 42 comprises a closure element 44 which can be arranged on one of the two housing halves 16, 18. In FIG. 1, closure element 44 is arranged on housing half 16 and formed as a bracket. A projection 46 via which closure element 44 can be guided is furthermore arranged on housing half 18. Further locking component 42 locks first connection component 24 in the second functional position if second connection component 30 is in the connection position.

If the first connection component 24 is in the second functional position, the two housing halves 16, 18 engage in one another and, in combination, form a gap-free housing. That is, a flow channel of fluid lines 12, 14 for the fluid between the two housing halves 16, 18 has no open connection to the outer surroundings.

FIG. 3a shows second housing half 18 which is connected to fluid line 14. Second housing half 18 of device 10 encloses a line end piece 48 which is connected to fluid line 14, first female connection element 28 of first connection component 24, at least one second female connection element 32 of second connection component 30 and further line 36. If further line 36 is formed as a heating wire, further line 36 can be wound inside second housing half 18 around fluid line 14 and first female connection element 28. Further line 36 formed as a heating wire can thus heat second housing half 18 over the entire circumference so that a freezing of a fluid in fluid line 14 on second housing half 18 is counteracted.

First female connection element 28 is oriented along connection axis 20. Connection axis 20 is itself oriented along a direction of flow in fluid line 14 if fluid line 14 is connected to fluid line 12.

Second female connection element 32 is oriented along a circumferential direction 22 which extends around connection axis 20. In this example, second housing half 18 has two second female connection elements 32. Both second female connection elements 32 are arranged at diametrically opposite positions along the circumference of fluid line 14. Both second female connection elements 32 are furthermore oriented in the same direction along circumferential direction 22. I.e. that if circumferential direction 22 is followed, both second female connection elements 34 are of the same orientation.

FIG. 3b shows first housing half 16 which is connected to fluid line 12. First housing half 16 of device 10 encloses in this case a line end piece 50 which is connected to fluid line 12. First housing half 16 furthermore encloses first male connection element 26 of first connection component 24, at least one second male connection element 34 of second connection component 30 and a further line 38. Further line 38 can be formed as a heating wire and then be wound inside first housing half 16 around fluid line 12 and first male connection element 26. This has the effect that the further line 38 can heat the first housing half 16 over its entire circumference in order to counteract a freezing of a fluid in fluid line 12.

First male connection element 26 is oriented along connection axis 20 which is oriented parallel to a direction of flow of a fluid in fluid line 12 if fluid line 12 is connected to fluid line 14. First male connection element 26 can thus be introduced along connection axis 20 into first female connection element 28 in order to transfer first connection component 24 from the first functional position into the second functional position.

The at least one second male connection element 34 is oriented along circumferential direction 22 which extends around connection axis 20. In this example, second connection component 30 comprises two second male connection elements 34. Both second male connection elements 34 are arranged diametrically opposite along circumferential direction 22. They point in the same direction along circumferential direction 22.

Further lines 36, 38 can alternatively or additionally be optical lines, for example, glass fibers.

Alternatively or additionally, further lines 36, 38 can be electric lines which transmit signals.

FIG. 4 shows a system 100 which comprises a catalytic converter 52 for selective catalytic reduction, two fluid lines 12, 14 and two further lines 36, 38. Fluid line 14 is arranged in catalytic converter 52. Further line 36 is likewise arranged in catalytic converter 52. Fluid line 12 and further line 38 are arranged outside catalytic converter 52. Device 10 connects the two fluid lines 12, 14. Device 10 simultaneously connects the two further lines 36, 38.

First housing half 16 of device 10 is connected to fluid line 12. Second housing half 18 of device 10 is furthermore connected to fluid line 12. Second housing half 18 is thus likewise connected to catalytic converter 52.

Instead of catalytic converter 52 for selective catalytic reduction, a water injection system can be provided which comprises fluid line 14 and further line 36. The water injection system is not represented.

The invention is not restricted to one of the embodiments described above, but rather can be modified in various ways.

All of the features and advantages which proceed from the claims, the description and the drawing, including constructive details, spatial arrangements and method steps, can be essential to the invention both on their own and also in a wide range of combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMBERS

10 Device
12 Fluid line

14 Fluid line
16 First housing half
18 Second housing half
20 Connection axis
22 Circumferential direction
24 First connection component
26 First male connection element
28 First female connection element
30 Second connection component
32 Second female connection element
34 Second male connection element
36 Further line
38 Further line
40 Seal element
42 Further locking component
44 Closure element
46 Projection
48 Line end piece
50 Line end piece
52 Catalytic converter
54 Locking component
100 System

The invention claimed is:

1. A device for connecting fluid lines and further lines, wherein the device has a first connection component for connecting fluid lines and a second connection component for connecting further lines;
wherein the first connection component has a first functional position, in which the first connection component detaches the two fluid lines from one another, and a second functional position, in which the first connection component connects two fluid lines;
wherein a movement of the first connection component along a connection axis of the device transfers the first connection component between the first and second functional position;
wherein the second connection component, in one connection position, connects two further lines and, in a release position, detaches the two further lines from one another;
wherein a movement of the second connection component in a circumferential direction around the connection axis transfers the second connection component between the release position and the connection position if the first connection component is in the second functional position; and
wherein the first connection component has a first male connection element on one of the two fluid lines and a first female connection element on the other of the two fluid lines.

2. The device as claimed in claim 1, wherein the device has a locking component which, in a locking position, locks the first connection component in the second function position and, in an unlocking position, releases the first connection component.

3. The device as claimed in claim 2, wherein the locking component has a latch element which is oriented along the circumferential direction, wherein a movement of the locking component in the circumferential direction transfers the locking component between the locking position and the unlocking position if the first connection component is in the second functional position.

4. The device as claimed in claim 2, wherein the second connection component is the locking component.

5. The device as claimed in claim 1, wherein the first male connection element and the first female connection element are oriented along the connection axis.

6. The device as claimed in claim 1, wherein the second connection component has a second male connection element on one of the two further lines and a second female connection element on the other of the two further lines.

7. The device as claimed in claim 6, wherein the second male connection element and the second female connection element are configured along the circumferential direction.

8. The device as claimed in claim 1, wherein the further lines are heating wires.

9. The device as claimed in claim 1, wherein the device has a first housing half and a second housing half, wherein the first housing half is connected to one of the two fluid lines, wherein the second housing half is connected to the other of the two fluid lines, wherein the first housing half and the second housing half form a housing if the first connection component is in the second functional position, wherein the first and second connection components are arranged inside the first and second housing halves.

10. The device as claimed in claim 9, wherein the first and second housing halves have a gap-free connection to one another if the first connection component is in the second functional position.

11. The device as claimed in claim 9, wherein the first housing half has the first male connection element and the second housing half has the first female connection element.

12. The device as claimed in claim 9, wherein the second connection component has a second male connection element on one of the two further lines and a second female connection element on the other of the two further lines, and wherein the first housing half has the second male connection element and the second housing half has the second female connection element.

13. The device as claimed in claim 1, wherein the device has a further locking component for locking the first connection component in the second functional position.

14. The device as claimed in claim 13, wherein the further locking component has a closure element.

15. The device as claimed in claim 13, wherein the device has a first housing half and a second housing half, wherein the first housing half is connected to one of the two fluid lines, wherein the second housing half is connected to the other of the two fluid lines, wherein the first housing half and the second housing half form a housing if the first connection component is in the second functional position, wherein the first and second connection components are arranged inside the first and second housing halves, and wherein the further locking component is integrated into the first and/or second housing half.

16. The device as claimed in claim 1, wherein the first connection component has at least one seal element for arrangement between the two fluid lines.

17. The device as claimed in claim 16, wherein the at least one seal element is an O-ring.

18. A system comprising a device according to claim 1, wherein the system comprises two further lines and two fluid lines, wherein the device connects the two further lines and the two fluid lines to one another.

19. The system as claimed in claim 18, wherein the system is a catalytic converter for selective catalytic reduction or a water injection system.

* * * * *